United States Patent
Cho et al.

(10) Patent No.: US 12,503,524 B2
(45) Date of Patent: Dec. 23, 2025

(54) METHOD FOR PURIFYING POLYALKYLALUMINOXANE-CONTAINING SOLUTION USING HYDROXY GROUP-CONTAINING COMPOUND AND CATALYST COMPOSITION USING THE SAME

(71) Applicant: LG Chem, Ltd., Seoul (KR)

(72) Inventors: Yoon Hee Cho, Daejeon (KR); Ue Ryung Seo, Daejeon (KR); Seung Hyo Kim, Daejeon (KR); Seung Hwan Jung, Daejeon (KR); A Rim Kim, Daejeon (KR); Ki Won Han, Daejeon (KR); Hyo Jung Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 939 days.

(21) Appl. No.: 17/634,721

(22) PCT Filed: Sep. 29, 2020

(86) PCT No.: PCT/KR2020/013380
§ 371 (c)(1),
(2) Date: Feb. 11, 2022

(87) PCT Pub. No.: WO2021/066550
PCT Pub. Date: Apr. 8, 2021

(65) Prior Publication Data
US 2022/0275113 A1 Sep. 1, 2022

(30) Foreign Application Priority Data
Sep. 30, 2019 (KR) ........................ 10-2019-0121157

(51) Int. Cl.
*C08F 4/602* (2006.01)
*C08F 10/02* (2006.01)
(52) U.S. Cl.
CPC ............ *C08F 4/6028* (2013.01); *C08F 10/02* (2013.01)
(58) Field of Classification Search
CPC .................. C08F 4/6028; C08F 10/02; B01J 31/22–2295
See application file for complete search history.

(56) References Cited

U.S. PATENT DOCUMENTS

| | | | |
|---|---|---|---|
| 5,329,032 A | 7/1994 | Tran et al. | |
| 5,416,229 A | 5/1995 | Tran et al. | |
| 5,831,109 A | 11/1998 | Smith et al. | |
| 6,515,155 B1 | 2/2003 | Klosin et al. | |
| 10,124,326 B2 * | 11/2018 | Sogoh | C07F 7/08 |
| 10,150,823 B2 * | 12/2018 | Tsurugi | C08F 10/02 |
| 2005/0239637 A1 | 10/2005 | Lindroos et al. | |
| 2011/0282017 A1 | 11/2011 | Kaji et al. | |
| 2012/0071679 A1 | 3/2012 | Fang et al. | |
| 2015/0057418 A1 | 2/2015 | Kaji et al. | |
| 2015/0376306 A1 | 12/2015 | Tsurugi et al. | |
| 2016/0297843 A1 | 10/2016 | Lee et al. | |
| 2017/0240664 A1 | 8/2017 | Tsurugi et al. | |
| 2019/0062470 A1 | 2/2019 | Tsurugi et al. | |

FOREIGN PATENT DOCUMENTS

| | | |
|---|---|---|
| CN | 1058267 C | 11/2000 |
| CN | 104968668 A | 10/2015 |
| EP | 0561476 A1 | 9/1993 |
| JP | 2001040024 A | 2/2001 |
| JP | 2012529507 A | 11/2012 |
| JP | 2016037452 A | 3/2016 |
| KR | 960005169 B1 | 4/1996 |
| KR | 100738694 B1 | 7/2007 |
| KR | 20110094301 A | 8/2011 |
| KR | 20140138337 A | 12/2014 |
| KR | 20160019875 A | 2/2016 |
| KR | 20160121705 A | 10/2016 |
| KR | 20170068621 A | 6/2017 |
| KR | 101801010 B1 | 11/2017 |
| WO | 9723288 A1 | 7/1997 |
| WO | 2014123212 A1 | 8/2014 |

OTHER PUBLICATIONS

Extended European Search Report including Written Opinion for Application No. 20871977.3 dated Aug. 17, 2022, pp. 1-9.
Romano, D. et al., "Aluminoxane co-catalysts for the activation of a bis phenoxyimine titanium (IV) catalyst in the synthesis of disentangled ultra-high molecular weight polyethylene", Polymer, vol. 74, Jul. 31, 2015 (Jul. 31, 2015), pp. 76-85. XP029272175.
Tanaka, R. et al., "An Alternative Method for the Preparation of Trialkylaluminum-Depleted Modified Methylaluminoxane (dMMAO) ", Macromolecules, vol. 50, No. 15, Jul. 20, 2017 (Jul. 20, 2017), pp. 5989-5993. XP055801674.
International Search Report for PCT/KR2020/013380 dated Jan. 15, 2021. 4 pgs.

* cited by examiner

*Primary Examiner* — Richard M Rump
(74) *Attorney, Agent, or Firm* — Lerner David LLP

(57) ABSTRACT

The present invention relates to a method for purifying a polyalkylaluminoxane-containing solution using a hydroxy group-containing compound, a method for producing a catalyst composition using the method, a catalyst composition produced by the production method, and a method for producing an olefin polymer using the catalyst composition.

9 Claims, No Drawings

METHOD FOR PURIFYING POLYALKYLALUMINOXANE-CONTAINING SOLUTION USING HYDROXY GROUP-CONTAINING COMPOUND AND CATALYST COMPOSITION USING THE SAME

CROSS-REFERENCE TO RELATED APPLICATIONS

The present application is a national stage entry under U.S.C. § 371 of International Application No. PCT/KR2020/013380 filed on Sep. 29, 2020, which claims priority from Korean Patent Application No. 10-2019-0121157 filed on Sep. 30, 2019, all the disclosures of which are incorporated herein by reference.

TECHNICAL FIELD

The present invention relates to a method for purifying a polyalkylaluminoxane-containing solution using a hydroxy group-containing compound, a method for producing a catalyst composition using the method, a catalyst composition produced by the production method, and a method for producing an olefin polymer using the catalyst composition.

BACKGROUND ART

A polyalkylaluminoxane composition, which is a partial hydrolysate of alkylaluminum, is widely known to act as a co-catalyst or a scavenger for activating a main catalyst in the production of olefin polymers. A scavenger is a material added to a catalyst system to react with impurities present in a polymerization reactor, a solvent, a monomer feed, and the like, and through the reaction with the impurities, serves to prevent the poisoning of a catalyst during a polymerization process of olefinic monomers. Specifically, as the scavenger, various kinds of compounds such as trialkylaluminum, alkylaluminoxane, dialkylzinc, and dialkylmagnesium are used. As described above, polymethylaluminoxane, polyisobutylaluminoxane, and the like may be examples thereof.

Polyalkylaluminoxane, which is one example of a scavenger, is commercially available as a solution in the state of being dissolved in a hydrocarbon solvent such as toluene, and may be purchased and used in a polymerization reaction when needed. At this time, a commercially available polyalkylaluminoxane solution contains trimethylamine (TMA), triisobutylaluminum (Tibal), and the like in addition to polyalkylaluminoxane which is the main component. When used for polymerization as it is, TMA, Tibal, and the like causes a reaction with a transition metal compound which acts as a main catalyst, thereby interfering the production of an olefin polymer by degrading the catalytic activity of the transition metal compound, or making it impossible to produce a high molecular weight olefin polymer by participating in the polymerization reaction and acting as a chain transfer agent.

As a typical method for removing impurities such as Tibal from a commercially available polyalkylaluminoxane solution, a method for preventing an additional reaction of Tibal is disclosed, wherein a purchased composition solution is reacted with 2,6-di-tert-butyl-4-methylphenol (BHT) to combine the BHT with an aluminum element of Tibal.

However, although Tibal, which freely floats in the solution, may be removed through the above reaction, a product in which Tibal and BHT are combined is also soluble in a hydrocarbon solvent constituting a polyalkylaluminoxane composition, and thus, participates in the polymerization reaction. Therefore, it is expected that another problem may arise.

Therefore, there is a need for the development of a method which improves the catalytic activity of a transition metal compound during the polymerization reaction of olefinic monomers by removing Tibal present in a commercially available polyalkylaluminoxane solution to the maximum, while not interfering with the ability of polyalkylaluminoxane to scavenge polar impurities or activate a catalyst, and removes Tibal permanently from the solution, thereby preventing a problem in which Tibal floats back in the solution due to a reverse reaction.

PRIOR ART DOCUMENT

Patent Document

KR 1996-0005169 B1

DISCLOSURE OF THE INVENTION

Technical Problem

An aspect of the present invention provides a method in which a polyalkylaluminoxane-containing solution is reacted with a hydroxy group-containing compound, a reaction product is filtered and purified, and then a filtered and purified resultant is mixed with a transition metal compound to prepare a catalyst composition.

Another aspect of the present invention provides a catalyst composition using a polyalkylaluminoxane-containing solution containing a small amount of trialkylaluminum.

Yet another aspect of the present invention provides a method for producing an olefin polymer using the catalyst composition.

Technical Solution

According to an aspect of the present invention, there is provided a method for producing a catalyst composition, the method including (S1) preparing a polyalkylaluminoxane-containing solution including polyalkylaluminoxane, trialkylaluminum, and a hydrocarbon solvent, (S2) reacting the polyalkylaluminoxane-containing solution with a hydroxy group-containing compound, (S3) filtering a reaction product of Step (S2), and (S4) mixing a filtrate of Step (S3) and a transition metal compound.

According to another aspect of the present invention, there is provided a catalyst composition including a polyalkylaluminoxane-containing solution having polyalkylaluminoxane, trialkylaluminum, and a hydrocarbon solvent, and a transition metal compound, wherein the trialkylaluminum is 4.3 mol % or less based on the polyalkylaluminoxane-containing solution.

According to yet another aspect of the present invention, there is provided a method for producing an olefin polymer, the method including polymerizing olefinic monomers in the presence of the catalyst composition.

Advantageous Effects

When a commercially available polyalkylaluminoxane-containing solution is purified according to a method of the present invention, trialkylaluminum present in the solution may be removed therefrom. When the polyalkylaluminoxane-containing solution from which trialkylaluminum is removed is used as a catalyst composition, there is an effect of preventing a polymerization reaction from being disturbed by the trialkylaluminum and increasing the activity of a main catalyst compound to the maximum, thereby efficiently producing an olefin polymer.

In addition, since a produced insoluble solid has been physically removed from the catalyst composition of the present invention, there is no need to be concerned with a problem of a reverse reaction. In addition, since a separate additive such as BHT is not required, there is an advantage in that only trialkylaluminum is easily removed from the solution and there is no separate residue remaining in the solution, thereby obtaining a high purity olefin polymer.

MODE FOR CARRYING OUT THE INVENTION

Hereinafter, the present invention will be described in more detail to facilitate understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

[Method for Producing Catalyst Composition]

A method for producing a catalyst composition of the present invention is characterized by including (S1) preparing a polyalkylaluminoxane-containing solution including polyalkylaluminoxane, trialkylaluminum, and a hydrocarbon solvent, (S2) reacting the polyalkylaluminoxane-containing solution with a hydroxy group-containing compound, (S3) filtering a reaction product of Step (S2), and (S4) mixing a filtrate of Step (S3) and a transition metal compound.

Step (S1)

Step (S1) is a step of preparing a polyalkylaluminoxane-containing solution including polyalkylaluminoxane, trialkylaluminum, and a hydrocarbon solvent.

The preparation of the polyalkylaluminoxane-containing solution may all be included in the present invention regardless of the method or route for obtaining the same, but may specifically mean preparation by obtaining a commercially available polyalkylaluminoxane-containing solution. Polyalkylaluminoxane currently commercially available is sold in a solution state of being dissolved in a hydrocarbon solvent and contains a predetermined content of trialkylaluminum, and thus, has a problem of degrading the catalytic activity of a main catalyst when participating in a polymerization reaction. An object of the present invention is to perform purification such that trialkylaluminum included in a polyalkylaluminoxane-containing solution prepared in Step (S1) is efficiently removed, and thus, the polyalkylaluminoxane-containing solution from which trialkylaluminum is removed is more usefully used when producing an olefin polymer.

The polyalkylaluminoxane may be added as a material to serve as a scavenger, a co-catalyst, or both in a catalyst composition.

The polyalkylaluminoxane may be one or more selected from the group consisting of polymethylaluminoxane, polyethylaluminoxane, polyisobutylaluminoxane, and polybutylaluminoxane, and may be, for example, polyisobutylaluminoxane, but is not limited thereto.

The trialkylaluminum may be one or more selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, and methyldiethylaluminum, and may preferably be triisobutylaluminum, but is not limited thereto.

The hydrocarbon solvent may be one or more selected from the group consisting of an aliphatic hydrocarbon solvent containing any one of pentane, hexane, heptane, nonane, decane, cyclohexane, and an isomer thereof, and the like, and an aromatic hydrocarbon solvent containing any one of toluene, benzene, xylene, and an isomer thereof, and the like, and may preferably be hexane, but is not limited thereto.

Preferably, Step (S1) may be a step of preparing a mixed solution containing polyisobutylaluminoxane, triisobutylaluminum, and hexane.

The content of the hydrocarbon solvent included in the polyalkylaluminoxane-containing solution may be 20 to 99 wt % based on the polyalkylaluminoxane-containing solution. When the content of a hydrocarbon solvent is less than 20 wt %, as described below, insoluble solids produced by the reaction of a polyalkylaluminoxane-containing solution and a hydroxy group-containing compound are entangled with each other, and thus, are not stirred well. As a result, it may be difficult to implement the effect of the present invention which is to remove trialkylaluminum in the polyalkylaluminoxane-containing solution. Therefore, a sufficient amount of the hydrocarbon solvent is required.

Step (S2)

Step (S2) is a step of reacting the polyalkylaluminoxane-containing solution with a hydroxy group-containing compound.

A method for reacting the polyalkylaluminoxane-containing solution with a hydroxy group-containing compound may be performed by adding a hydroxy group-containing compound to the polyalkylaluminoxane-containing solution prepared in Step (S1), for example, by moving a hydroxy group-containing compound in a slurry state to the polyalkylaluminoxane-containing solution. In addition, the method may also be performed by adding the polyalkylaluminoxane-containing solution to a hydroxy group-containing compound. As long as a polyalkylaluminoxane-containing solution and a hydroxy group-containing compound may be brought into contact with each other to react, the order or rate of mixing of each material is not limited, and may be suitably adjusted by those skilled in the art.

In Step (S2), trialkylaluminum and a hydroxy group-containing compound are reacted in a mixed solution of a polyalkylaluminoxane-containing solution and a hydroxy group-containing compound, thereby producing a solid product, and the solid product may be insoluble in a hydrocarbon solvent in the mixed solution.

Unlike trialkylaluminum, which is a natural flammable and water-prohibiting substance, and thus, is classified as a third-class hazardous material, the insoluble solid is stable in air, and thus, is a non-hazardous material which does not burn, or generates combustible materials. The production method of the present invention not only efficiently removes trialkylaluminum, but also transforms trialkylaluminum, which is hazardous, into a non-hazardous material, and thus, is more preferable than a method for physically separating trialkylaluminum or aluminoxane itself.

In addition, the hydroxy group-containing compound may be 100 equivalents or less based on 1 equivalent of trialkylaluminum contained in the polyalkylaluminoxane-containing solution. Specifically, the hydroxy group-containing compound may be 0.01 to 100.00 equivalents based on equivalent of trialkylaluminum contained in the polyalkylaluminoxane-containing solution, and may be used in an amount of 0.01 equivalents or more, 0.05 equivalents or more, 0.10 equivalents or more, 1.00 equivalent or more, 100.00 equivalents or less, 50.00 equivalents or less, or 10.00 equivalents or less.

When the hydroxy group-containing compound is less than 0.01 equivalents, the reaction with trialkylaluminum may not be sufficiently achieved, so that the effect of removing trialkylaluminum may be insignificant. When the hydroxy group-containing compound is greater than 100 equivalents, the efficiency of removing trialkylaluminum is not increased in proportion to the amount of a hydroxy group-containing compound used, so that economic feasibility may be degraded. In addition, insoluble solids are generated in an excessive amount, and thus, are entangled with each other, making it difficult to stir and filter the same.

The hydroxy group-containing compound means a compound containing one or more hydroxy groups, specifically a C2-60 compound containing two or more hydroxy groups. Preferably, the hydroxy group-containing compound may be a C2-30 compound containing two or more hydroxy groups. As described above, a hydroxy group-containing compound including two or more hydroxy groups may react with trialkylaluminum more efficiently, and thus, may be preferably used.

When a hydroxy group-containing compound has a low solubility in an organic solvent such as hexane, it is highly likely that a material combined with trialkylaluminum is solidified. Therefore, the effect of the present invention may be implemented more excellently.

At this time, a hydroxy group may be substituted on an aromatic ring, or may be coupled to a hydrocarbon chain. When there are two or more aromatic rings, hydroxy groups may each be substituted on a different aromatic ring, or may all be substituted on one aromatic ring, but the present invention is not limited thereto.

Specific examples of the hydroxy group-containing compound may be one or more selected from the group consisting of 1,3,5-trihydroxybenzene, neopentylglycol, naphthalene-1,5-diol, ethyleneglycol, bisphenol-A, catechol, methylhydroquinone, and 1,2,3-trihydroxybenzene, but are not limited thereto.

Step (S3)

Step (S3) is a step of filtering a reaction product of Step (S2), and is a step of filtering an insoluble solid produced by the reaction of trialkylaluminum and the hydroxy group-containing compound in the previous Step (S2) using a filtration membrane, thereby removing the insoluble solids from a mixed solution.

The filtration may be performed using a filtration membrane having a pore size of 0.1 to 40.0 µm, specifically 0.10 µm or greater, 0.15 µm or greater, 0.20 µm or greater, 1.0 µm or greater, 5.0 µm or greater, 7.0 µm or greater, 40.0 µm or less, 35.0 µm or less, 30.0 µm or less, 20.0 µm or less, 15.0 µm or less, or for example, 10 µm.

When the pore size of the filtration membrane is less than 0.1 µm, there may be a problem in that the insoluble solid produced by the reaction of trialkylaluminum and the hydroxy group-containing compound may block pores of the filtration membrane, thereby degrading filtration efficiency and prolong filtration time. When the pore size of the filtration membrane is greater than 40.0 µm, the insoluble solid passes through the filtration membrane, resulting in not being able to separate and remove the insoluble solid.

In the present invention, a filtration membrane having a pore size within a range which may allow a solid produced in Step (S2) to be efficiently removed may be appropriately selected and used. As a result, a high purity polyalkylaluminoxane-containing solution from which trialkylaluminum has been efficiently removed may be obtained.

In Step (S3), the reaction product of Step (2) may be immediately filtered, or the reaction product of Step (2) may be left to stand to precipitate an insoluble solid, and then only the supernatant is recovered and filtered. Only the supernatant may be recovered and filtered as described above to primarily remove a large amount of insoluble solids, and as a result, the efficiency of removing insoluble solids may be increased.

As described above, the method for producing a catalyst composition of the present invention physically removes trialkylaluminum included in the polyalkylaluminoxane-containing solution through Steps (S1) to (S3), so that the trialkylaluminum in the solution may be reduced to be 4.3 mol % or less, and the content of trialkylaluminum may be further reduced depending on reaction conditions, types of polyalkylaluminoxane and trialkylaluminum, the pore size of a filtration membrane, and the like.

Step (S4)

Step (S4) is a step of mixing a filtrate of Step (S3) and a transition metal compound.

As described above, in the present invention, a solution is obtained in which the relative content of polyalkylaluminoxane is increased and the content of impurities such as trialkylaluminum is decreased through Steps (S1) to (S3). In addition, through Step (S4), a catalyst composition is produced by mixing a transition metal compound acting as a main catalyst. The catalyst composition produced as described above contains polyalkylaluminoxane, which is used as a scavenger and/or a co-catalyst while not being disturbed by trialkylaluminum, so that the catalytic activity of the transition metal compound may be significantly improved.

[Catalyst Composition]

A catalyst composition of the present invention includes a polyalkylaluminoxane-containing solution including polyalkylaluminoxane, trialkylaluminum, and a hydrocarbon solvent, and a transition metal compound, wherein the trialkylaluminum is 4.3 mol % or less based on the polyalkylaluminoxane-containing solution.

The catalyst composition may be obtained by the production method of the present invention. The catalyst composition is produced by removing trialkylaluminum in a polyalkylaluminoxane-containing solution and mixing the polyalkylaluminoxane-containing solution from which trialkylaluminum has been removed with a transition metal compound according to the present invention. The content of trialkylaluminum included in the polyalkylaluminoxane-containing solution is as low as 4.3 mol % or less.

As described above, the catalyst composition includes polyalkylaluminoxane and a transition metal compound (main catalyst compound), and may further include one or more co-catalyst compounds. At this time, the catalyst composition may refer to a state in which three components of a transition metal compound, a co-catalyst compound, and polyalkylaluminoxane are mixed simultaneously or in any order to be obtained as a component with obtained as a composition with activity.

As the transition metal compound, any compound known to be able to act as a catalyst in the polymerization reaction of olefinic monomers may be used.

The co-catalyst may include one or more selected from Formulas 1 or 2 below, but the present invention is not limited thereto.

$$D(R_1)_3 \quad \text{[Formula 1]}$$

In Formula 1 above, D is boron, and $R_1$ is each independently a halogen radical, a hydrocarbyl radical having 1 to 20 carbon atoms, or a hydrocarbyl radical having 1 to 20 carbon atoms substituted with halogen.

$$[L-H]^+[Z(A)_4]^- \text{ or } [L]^+[Z(A)_4]^- \quad \text{[Formula 2]}$$

In Formula 2 above, L is a neutral or cationic Lewis acid, H is a hydrogen atom, Z is a Group 13 element, A is each independently an aryl group having 6 to 20 carbon atoms in which one or more hydrogen atoms may be substituted with a substituent, or an alkyl group having 1 to 20 carbon atoms in which one or more hydrogen atoms may be substituted with a substituent, and the substituent of A is a halogen atom, a hydrocarbyl group having 1 to 20 carbon atoms, an alkoxy group having 1 to 20 carbon atoms, or an aryloxy group having 6 to 20 carbon atoms.

A compound represented by Formula 1 above may include trimethylboron, triethylboron, triisobutylboron, tripropylboron, tributylboron, and the like, but is not limited thereto.

Examples of a compound represented by Formula 2 above may include trimethylammonium tetraphenylborate, triethylammonium tetraphenylborate, tripropylammonium tetraphenylborate, tributylammonium tetraphenylborate, trimethylammonium tetra(p-tolyl)borate, triethylammonium tetra(p-tolyl)borate, tripropylammonium tetra(p-tolyl)borate, tributylammonium tetra(p-tolyl)borate, trimethylammonium tetra(o,p-dimethylphenyl)borate, triethylammonium tetra(o,p-dimethylphenyl)borate, tripropylammonium tetra(o,p-dimethylphenyl)borate, tributylammonium tetra(p-tolyl)borate, trimethylammonium tetra(p-trifluoromethylphenyl)borate, triethylammonium tetra(p-trifluoromethylphenyl)borate, tripropylammonium tetra(p-trifluoromethylphenyl)borate, tributylammonium tetra(p-trifluoromethylphenyl)borate, trimethylammonium tetra(pentafluorophenyl)borate, triethylammonium tetra(pentafluorophenyl)borate, tripropylammonium tetra(pentafluorophenyl)borate, tributylammonium tetra(pentafluorophenyl)borate N,N-diethylanilinium tetraphenylborate, N,N-diethylanilinium tetra(pentafluorophenyl)borate, diethylammonium tetra(pentafluorophenyl)borate, triphenylphosphonium tetraphenylborate, triphenylphosphonium tetraphenylborate, triphenylcarbonium tetra(p-trifluoromethylphenyl)borate, triphenylcarbonium tetra(pentafluorophenyl)borate, trimethylammonium tetraphenylaluminate, triethylammonium tetraphenylaluminate, tripropylammonium tetraphenylaluminate, tributylammonium tetraphenylaluminate, trimethylammonium tetra(p-tolyl)aluminate, triethylammonium tetra(p-tolyl)aluminate, tripropylammonium tetra(p-tolyl)aluminate, tributylammonium tetra(p-tolyl)aluminate, trimethylammonium tetra(o,p-dimethylphenyl)aluminate, triethylammonium tetra(o,p-dimethylphenyl)aluminate, tripropylammonium tetra(o,p-dimethylphenyl)aluminate, tributylammonium tetra(p-tolyl)aluminate, trimethylammonium tetra(p-trifluoromethylphenyl)aluminate, triethylammonium tetra (p-trifluoromethylphenyl)aluminate, tripropylammonium tetra(p-trifluoromethylphenyl)aluminate, tributylammonium tetra(p-trifluoromethylphenyl)aluminate, trimethylammonium tetra(pentafluorophenyl)aluminate, triethylammonium tetra(pentafluorophenyl)aluminate, tripropylammonium tetra(pentafluorophenyl)aluminate, tributylammonium tetra (pentafluorophenyl)aluminate, N,N-diethylanilinium tetraphenylaluminate, N,N-diethylanilinium tetra (pentafluorophenyl)aluminate, diethylammonium tetra (pentafluorophenyl)aluminate, and the like, but are not limited thereto.

The catalyst composition may be produced by a production method including obtaining a mixture by bringing a transition metal compound into contact with a compound represented by Formula 1 above, and adding a compound represented by Formula 2 to the mixture.

At this time, the molar ratio of the compound represented by Formula 1 to the transition metal compound may be 1:2 to 1:5,000, preferably 1:10 to 1:1,000, and more preferably 1:20 to 1:500.

When the molar ratio of the compound represented by Formula 1 to the transition metal compound is less than 1:2, the amount of an alkylating agent is very small, so that there is a problem in that the alkylation of a metal compound is not completely achieved. When greater than 1:5,000, the alkylation of the metal compound is achieved, but there is a problem in that the activation of the alkylated metal compound is not completely achieved due to a side reaction between the remaining excess alkylating agent and an activating agent, which is the compound represented by Formula 2 above.

In addition, the catalyst composition may be produced by a production method including bringing a transition metal compound into contact with the compound represented by Formula 2 above.

At this time, the molar ratio of the compound represented by Formula 2 to the transition metal compound may be 1:1 to 1:25, preferably 1:1 to 1:10, and more preferably 1:1 to 1:5.

When the molar ratio of the compound represented by Formula 2 to the transition metal compound is less than 1:1, the amount of an alkylating agent is relatively small, so that there is a problem in that the alkylation of a metal compound is not completely achieved, thereby reducing the activity of the catalyst composition. When greater than 1:25, the activation of the transition metal compound is completely achieved, but there is a problem in that the unit cost of the catalyst composition is not economical or the purity of a polymer produced is poor due to the remaining excess activating agent.

When producing the catalyst composition, a hydrocarbon-based solvent such as pentane, hexane, heptane, and the like, or an aromatic solvent such as benzene, toluene, and the like may be used as a reaction solvent, but the present invention is not necessarily limited thereto. All solvents available in the art may be used.

The polyalkylaluminoxane-containing solution included in the catalyst composition is low in trialkylaluminum content, and thus, may be usefully used as a scavenger and/or a co-catalyst when producing an olefin polymer. Therefore, the catalyst composition provided in the present invention has excellent activity for promoting a polymerization reaction, so that an olefin polymer may be produced in good yield using the catalyst composition.

In addition, since trialkylaluminum was converted to a solid product and filtered, and thus, was permanently removed from the polyalkylaluminoxane-containing solution, there is no risk of a problem in which a reverse reaction occurs, thereby allowing trialkylaluminum to be present in the solution again. Therefore, it is possible to further improve the stability and predictability of the polymerization reaction.

[Method for Producing Olefin Polymer]

A method for producing an olefin polymer of the present invention is characterized by including polymerizing olefinic monomers in the presence of the catalyst composition.

The term "polymer" refers to a polymer compound produced by polymerizing the same or different types of monomers. Thus, the generic term "polymer" covers the term "homopolymer" which is commonly used to refer to a polymer produced from a singly type of monomer and the term "interpolymer" as defined below.

The olefinic monomer may be one or more selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicosene, but is not limited thereto.

Specifically, the olefin polymer of the present invention may be an olefin homopolymer, an olefin/alpha-olefin copolymer, and preferably an ethylene/alpha-olefin copolymer depending on the type of the olefin-based monomer. In this case, the content of an alpha-olefin-based monomer, which is a co-monomer, may be appropriately selected by those skilled in the art depending on the use and purpose of the olefin polymer, and may be about 1 to 99 mol %.

The most preferred polymer production process using the catalyst composition is a solution process. However, when used together with an inorganic carrier such as silica, the catalyst composition may be applied to a slurry or gas phase process.

The catalyst composition may be injected after being dissolved or diluted in an aliphatic hydrocarbon solvent having 5 to 12 carbon atoms and suitable for a polymerization process of olefinic monomers, for example, pentane, hexane, heptane, nonane, decane, and an isomer thereof, an aromatic hydrocarbon solvent such as toluene and benzene, and a hydrocarbon solvent substituted with a chlorine atom such as dichloromethane and chlorobenzene. The solvent used herein is preferably used after removing a small amount of water or air, which acts as a catalyst poison, by a treatment using a small amount of an alkyl aluminum. It is also possible to use another co-catalyst in addition to the catalyst composition.

EXAMPLES

Hereinafter, the present invention will be described in detail with reference to Examples. However, the following Examples are merely illustrative of the present invention and are not intended to limit the scope of the present invention.

[Preparation of Reagent]

Polyisobutylaluminoxane was purchased from Tosho Co., Ltd, and used as it was dissolved in hexane. A polyisobutylaluminoxane-containing solution purchased from Tosho Co., Ltd includes 4.4 mol % of triisobutylaluminum. A hydroxy group-containing compound was purchased from either Aldrich Co., Ltd or TCI Co., Ltd.

Preparation and Purification of Polyisobutylaluminoxane-Containing Solution

Production Example 1

2.00 equivalents of 1,3,5-trihydroxybenzene based on equivalent of triisobutylaluminum included in the polyisobutylaluminoxane-containing solution was added to a 500 mL schlenk flask, and was vacuum-dried for 3 hours. 175 g of the polyisobutylaluminoxane-containing solution and 175 g of hexane were added to another 500 mL schlenk flask, and prepared.

Using 30 mL of hexane, 1,3,5-trihydroxybenzene prepared in the 500 mL schlenk flask above was all moved in a slurry state through a cannula to the 500 mL schlenk flask in which the polyisobutylaluminoxane-containing solution and hexane are contained.

After the movement was completed, the mixture was stirred for 12 hours and left to stand to form a solid product, and then left to stand overnight. While being left to stand, a supernatant portion was carefully filtered using a filter having a pore size of 10.0 μm.

Production Examples 2 to 11

A polyisobutylaluminoxane-containing solution was prepared in the same manner as in Example 1 except that changes have been made as shown in Table 1 below.

Comparative Production Example 1

A polyalkylaluminoxane-containing solution was purchased from Tosho Co., Ltd and used as it was.

TABLE 1

| | Hydroxy group-containing compound | Equivalent based on 1 equivalent of triisobutylaluminum | Pore size (μm) |
|---|---|---|---|
| Production Example 1 | 1,3,5-trihydroxybenzene | 2.00 | 10.00 |
| Production Example 2 | 1,3,5-trihydroxybenzene | 0.05 | 10.00 |
| Production Example 3 | 1,3,5-trihydroxybenzene | 2.00 | 0.15 |
| Production Example 4 | 1,3,5-trihydroxybenzene | 3.00 | 35.00 |
| Production Example 5 | Neopentylglycol | 4.00 | 10.00 |
| Production Example 6 | Naphthalene-1,5-diol | 4.00 | 10.00 |
| Production Example 7 | Ethyleneglycol | 6.60 | 10.00 |
| Production Example 8 | Bisphenol-A | 4.00 | 10.00 |
| Production Example 9 | Catechol | 2.00 | 10.00 |
| Production Example 10 | Methylhydroquinone | 4.00 | 10.00 |
| Production Example 11 | 1,2,3-trihydroxybenzene | 2.00 | 10.00 |
| Comparative Production Example 1 | — | — | 10.00 |

Experimental Example 1

(1) Triisobutylaluminum (mol %)

A solution obtained by performing filtration as described above was dissolved in a THF deuterated solvent by $^1$H NMR, and the content of remaining triisobutylaluminum was measured.

(2) Filtering Time (Hr)

The time until a filtration input all passed through a filter was measured.

(3) Recovery Rate (%)

Recovery rate (%)=Polyisobutylaluminoxane-containing solution recovered after filtration (g)/Polyisobutylaluminoxane-containing solution in a reactant state (g)]×100

TABLE 2

| | Triisobutylaluminum (mol %) | Filtering time (hr) | Recovery rate (%) |
|---|---|---|---|
| Production Example 1 | <0.1 | 0.1 | 94 |
| Production Example 2 | 2.900 | 0.1 | 95 |
| Production Example 3 | <0.1 | 24.0 | 90 |
| Production Example 4 | <0.1 | 0.1 | 95 |
| Production Example 5 | <0.1 | 0.1 | 90 |
| Production Example 6 | 1.176 | 0.1 | 90 |
| Production Example 7 | 0.137 | 0.1 | 90 |
| Production Example 8 | 1.470 | 0.1 | 90 |
| Production Example 9 | <0.1 | 0.1 | 90 |
| Production Example 10 | <0.1 | 0.1 | 90 |
| Production Example 11 | 0.176 | 0.1 | 90 |
| Comparative Production Example 1 | 4.400 | — | — |

As shown in Table 2 above, in all of Production Examples 1 to 11 produced by reacting a polyalkylaluminoxane-containing solution with a hydroxy group-containing compound and then performing filtration according to the present invention, triisobutylaluminum was largely removed, so that it can be seen that the content of remaining triisobutylaluminum was much lower than that of Comparative Production Example 1.

More specifically, in the case of Production Example 1 in which 2.00 equivalents of 1,3,5-trihydroxybenzene based on 1.00 equivalent of triisobutylaluminum was used and a filtration membrane having a pore size of 10.0 μm was used, triisobutylaluminum was selectively removed in a short period of time, so that the filtering time was reduced and the recovery rate was excellent.

Meanwhile, in the case of Production Example 2 in which 0.05 equivalents of 1,3,5-trihydroxybenzene based on 1.00 equivalent of triisobutylaluminum was used, the effect of removing triisobutylaluminum was relatively degraded.

In addition, in the case of Production Example 3 in which a filtration membrane having a pore size of 0.15 μm was used, the filtering time was increased, and in the case of Production Example 4 in which a filtration membrane having a pore size of 35.0 μm was used, some of insoluble solids were observed to be filtered through as well.

[Production of Olefin Polymer]

Example 1

A transition metal compound of Formula A below was prepared using a production method disclosed in Korean Patent Registration No. 10-0738694.

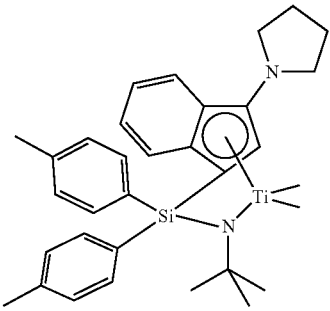
[Formula A]

A hexane solvent (900 mL) and 1-octene (300 mL) were filled in a 2 L autoclave continuous process reactor, and then the reactor was preheated to 150° C. Thereafter, ethylene was added into the autoclave continuous process reactor to set the pressure in the reactor to 35 bar, and then, 1 μmol of the transition metal compound, 10 equivalents of dimethylanilinium tetrakis(pentafluorophenyl)borate co-catalyst, 1.5 mmol of the polyisobutylaluminum-containing solution produced in Production Example 1 were simultaneously added to the reactor. A copolymer was produced by maintaining 8 minutes and continuously performing a co-polymerization reaction. Next, remaining ethylene gas was removed, and an excess of ethanol was added to the obtained copolymer-containing solution to induce precipitation. The precipitated polymer was washed with ethanol twice to three times, and then dried for more than 12 hours in a vacuum oven at 90° C. to obtain a copolymer.

Example 2

A transition metal compound of Formula B below was prepared using a production method disclosed in Korean Patent Registration No. 10-2016-0019875.

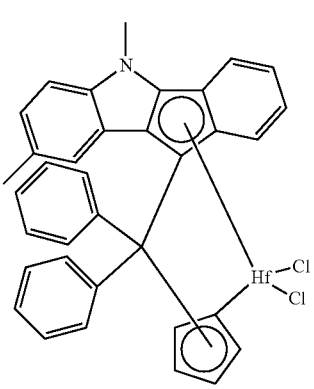
[Formula B]

An olefin polymer was produced in the same manner as in Example 1 except that the compound of Formula B above was used as a transition metal compound.

Comparative Example 1

An olefin polymer was produced in the same manner as in Example 1 except that the polyalkylaluminoxane-containing solution of Comparative Production Example 1 was used instead of that of Production Example 1.

Comparative Example 2

An olefin polymer was produced in the same manner as in Example 2 except that the polyalkylaluminoxane-containing solution of Comparative Production Example 1 was used instead of that of Production Example 1.

The types of the transition metal compounds and polyalkylaluminoxane-containing solutions used in Examples 1 and 2 and Comparative Examples 1 and 2 are summarized in Table 2 below.

TABLE 3

|  | Transition metal compound | Polyalkylaluminoxane-containing solution |
| --- | --- | --- |
| Example 1 | [Formula A] | Production Example 1 |
| Example 2 | [Formula B] | Production Example 1 |
| Comparative Example 1 | [Formula A] | Comparative production Example 1 |
| Comparative Example 2 | [Formula B] | Comparative production Example 1 |

[Analysis of Physical Properties of Olefin Polymer]

Experimental Example 1

The physical properties of the polymer produced in each of Examples and Comparative Examples were compared and analyzed. The measurement conditions and methods are as follows, and the measurement results are summarized in Table 3 below.

(1) Catalytic Activity (KgPE/mmol)

The catalyst activity was calculated by dividing the obtained polymer by the molar number of the transition metal compound used in the polymerization reaction.

(2) Melt Index ($MI_{2.16}$)

The melt index was measured by ASTM D-1238 (Condition E, 190° C., 2.16 Kg load).

(3) Density (g/cc)

A sheet having a thickness of 3 mm and a radius of 2 cm was manufactured as a sample with a press mold at 180° C. according to ASTM D-792, and then cooled at a rate of 10° C./min. The density was measured using a Mettler scale.

(4) Melting Temperature ($T_m$, ° C.)

The melting temperature of the polymer was measured using a Differential Scanning calorimeter (DSC, device name: DSC 2920, manufacturer: TA instrument). Specifically, the polymer was heated to 150° C., and then held for 5 minutes. The temperature of the polymer was decreased to −100° C., and then the temperature thereof was increased again. At this time, the temperature rising rate and the temperature falling rate were respectively adjusted to 10° C./min. The melting temperature was determined to be the maximum point of an endothermic peak measured in an interval in which the temperature rose for the second time.

(5) Crystallization Temperature ($T_c$, ° C.)

The same method was performed as in the measurement of the melting temperature using a DSC, and the crystallization temperature was determined to be the maximum point of an exothermic peak in a curve which appeared while decreasing the temperature.

TABLE 4

|  | Catalytic activity (KgPE/mmol) | $MI_{2.16}$ | Density (g/cc) | $T_m$ (° C.) | $T_c$ (° C.) |
| --- | --- | --- | --- | --- | --- |
| Example 1 | 70.5 | 0.23 | 0.895 | 93.3 | 76.9 |
| Example 2 | 123.0 | 0.67 | 0.860 | 42.9 | 23.7 |
| Comparative Example 1 | 20.35 | 0.009 | 0.893 | 92.4 | 74.6 |
| Comparative Example 2 | 32.0 | 0.57 | 0.856 | 40.5 | 20.3/40.4 |

As can be seen from the results of Table 3 above, in the case of Examples 1 and 2 in which the catalyst composition produced according to the present invention was used, the catalyst activity was significantly increased overall compared to that of Comparative Examples.

Specifically, when comparing Example 1 and Comparative Example 1 and Example 2 and Comparative Example 2 which have the same type of the transition metal compound, even though the transition metal compounds were the same, the catalyst activity of Examples 1 and 2 in which a polyisobutylaluminoxane-containing solution was reacted with a hydroxy group-containing compound and then triisobutylaluminum was removed was three times higher than that of Comparative Examples 1 and 2, respectively.

As described above, the catalyst composition produced by the production method of the present invention may increase the catalytic activity of a transition metal compound and produce an olefin polymer efficiently, which is conformed as an effect implementable in a variety of transition metal compounds, regardless of the type of transition metal compound.

The invention claimed is:

1. A method for producing a catalyst composition, the method comprising:
    (S1) preparing a polyalkylaluminoxane-containing solution including a polyalkylaluminoxane, a trialkylaluminum, and a hydrocarbon solvent;
    (S2) reacting the polyalkylaluminoxane-containing solution with a hydroxy group-containing compound;
    (S3) filtering a reaction product of Step (S2); and
    (S4) mixing a filtrate of Step (S3) and a transition metal compound,
    wherein the hydroxy group-containing compound is one or more selected from the group consisting of 1,3,5-trihydroxybenzene, neopentylglycol, naphthalene-1,5-diol, ethyleneglycol, bisphenol-A, catechol, methylhydroquinone, and 1,2,3-trihydroxybenzene.

2. The method of claim 1, wherein the polyalkylaluminoxane is one or more selected from the group consisting of polymethylaluminoxane, polyethylaluminoxane, polyisobutylaluminoxane, and polybutylaluminoxane.

3. The method of claim 1, wherein the trialkylaluminum is one selected from the group consisting of trimethylaluminum, triethylaluminum, or more tripropylaluminum, tributylaluminum, dimethylchloroaluminum, triisobutylaluminum, tri-s-butylaluminum, triisopropylaluminum, tricyclopentylaluminum, tripentylaluminum, triisopentylaluminum, trihexylaluminum, trioctylaluminum, ethyldimethylaluminum, and methyldiethylaluminum.

4. The method of claim 1, wherein the hydrocarbon solvent is 20 to 99 wt % based on the polyalkylaluminoxane-containing solution.

5. The method of claim 1, wherein the hydroxy group-containing compound is 0.01 to 100.00 equivalents based on 1 equivalent of trialkylaluminum contained in the polyalkylaluminoxane-containing solution.

6. The method of claim 1, wherein in Step (S2), a solid which is insoluble in the hydrocarbon solvent is produced by the reaction of the trialkylaluminum and the hydroxy group-containing compound.

7. The method of claim 1, wherein the filtration of Step (S3) is performed using a filtration membrane having a pore size of 0.1 to 40.0 μm.

8. The method of claim 1, wherein Step (S3) is performed by leaving the reaction product of Step (S2) to stand, and then recovering and filtering a supernatant therefrom.

9. The method of claim 1, wherein Step (S1) is a step of preparing a mixed solution containing polyisobutylaluminoxane, triisobutylaluminum, and hexane.

* * * * *